United States Patent
Kim et al.

(10) Patent No.: US 9,150,720 B2
(45) Date of Patent: Oct. 6, 2015

(54) CROSSLINKED POLYMER NANOPARTICLES CONTAINING COMPOSITION, METHOD FOR PREPARING A COPOLYMER USING THE COMPOSITION, AND VINYL CHLORIDE WITH IMPROVED FOAM MOLDING PROPERTIES

(75) Inventors: Yoon Ho Kim, Yeosu-si (KR); Geon Soo Kim, Daejeon (KR); Kwang Jin Lee, Yeosu-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/115,047

(22) PCT Filed: Aug. 14, 2012

(86) PCT No.: PCT/KR2012/006481
§ 371 (c)(1),
(2), (4) Date: Oct. 31, 2013

(87) PCT Pub. No.: WO2013/151213
PCT Pub. Date: Oct. 10, 2013

(65) Prior Publication Data
US 2014/0073713 A1   Mar. 13, 2014

(30) Foreign Application Priority Data

Apr. 3, 2012  (KR) .......................... 10-2012-0034193
Aug. 3, 2012  (KR) .......................... 10-2012-0085018

(51) Int. Cl.
  *C09D 5/02*   (2006.01)
  *C08L 33/12*   (2006.01)
  *C08L 27/06*   (2006.01)
  *C08L 33/20*   (2006.01)
  *C08J 9/00*   (2006.01)
  *C08L 25/14*   (2006.01)

(52) U.S. Cl.
  CPC ................ *C08L 27/06* (2013.01); *C08J 9/0061* (2013.01); *C08L 25/14* (2013.01); *C08L 33/12* (2013.01); *C08L 33/20* (2013.01); *C08J 2327/06* (2013.01); *C08J 2425/14* (2013.01); *C08J 2433/06* (2013.01); *C08L 2205/02* (2013.01); *C08L 2205/22* (2013.01); *C08L 2312/00* (2013.01)

(58) Field of Classification Search
  CPC ......... C08L 33/20; C08L 27/06; C08L 25/14; C08L 51/003; C08L 2312/00; C08L 2205/22; C08J 9/0061; C08J 2312/00; C08J 2433/06; C08J 2327/06
  USPC ........................................... 525/193; 521/139
  See application file for complete search history.

(56) References Cited

U.S. PATENT DOCUMENTS

| 5,442,012 A | 8/1995 | Kemper et al. | |
| 6,989,408 B2 * | 1/2006 | Ryu et al. | 523/201 |
| 7,071,246 B2 * | 7/2006 | Xie et al. | 523/201 |
| 2010/0093913 A1 * | 4/2010 | Jones et al. | 524/501 |

FOREIGN PATENT DOCUMENTS

| CN | 1479756 A | 3/2004 |
| CN | 1622961 A | 6/2005 |
| KR | 100398739 | 12/2003 |
| KR | 1020070039729 | 4/2007 |
| KR | 1020070047464 | 5/2007 |
| KR | 1020080060731 | 7/2008 |
| WO | 01/30908 | 5/2001 |

* cited by examiner

*Primary Examiner* — Nathan M Nutter
(74) *Attorney, Agent, or Firm* — Dentons US LLP

(57) ABSTRACT

Disclosed is a crosslinked polymer nanoparticle containing composition, a method for preparing a copolymer using the composition, and a vinyl chloride resin with improved foam molding properties. Processing aid in according with the present invention, provides the effects of improved foam molding properties and processibility of a vinyl chloride resin, during a foam molding process upon being added to the vinyl chloride resin.

14 Claims, No Drawings

CROSSLINKED POLYMER NANOPARTICLES CONTAINING COMPOSITION, METHOD FOR PREPARING A COPOLYMER USING THE COMPOSITION, AND VINYL CHLORIDE WITH IMPROVED FOAM MOLDING PROPERTIES

This application is a National Stage Entry of International Application No. PCT/KR 2012/006481, filed Aug. 14, 2012, and claims the benefit of Korean Application Nos. 10-2012-0034193 filed on Apr. 3, 2012 and 10-2012-0085018, filed Aug. 3, 2012, all of which are hereby incorporated by reference in their entirety for all purposes as if fully set forth herein.

BACKGROUND OF THE INVENTION

1. Field of the Invention

The present invention relates to a crosslinked polymer nanoparticle containing composition, a method for preparing a copolymer using the composition, and a vinyl chloride resin with improved foam molding properties comprising the same, and more particularly, to a crosslinked polymer nanoparticle containing composition capable of providing improved foam molding properties upon being added to a vinyl chloride resin (PVC), a method of preparing a copolymer using the composition, and a vinyl chloride resin with improved foam molding properties comprising the copolymer.

2. Description of the Related Art

Vinyl chloride resins that are polymers containing more than 50% of vinyl chloride have various applications due to its affordable, easy to control as hardness, and can be applied to most of the processing equipment. In addition, since they provide molded products having excellent physical and chemical properties, vinyl chloride resins have been widely used in various fields.

Such widely used vinyl chloride resins have several disadvantages in terms of impact strength, processibility, thermal stability, and thermal deformation temperature. Thus, additives have been developed to compensate these drawbacks. Additives such as impact modifiers, processing aids, stabilizers, fillers, and the like, were appropriately selected depending on the purpose and use thereof.

Recently, an attention has been increased to foam molding as a means to be lightweight and reduce prices of molded products. However, if it foam-molded vinyl chloride resins alone, it cannot have sufficient elongation and melt strength, so that the products have poor appearance, and cannot get low foaming magnification due to large size and non-uniform of foaming cell size. Thus, in order to complement these drawbacks, a method of adding a processing aid including methyl methacrylate as the main ingredient and a foaming agent to a vinyl chloride resin has been generally used.

U.S. Pat. No. 6,140,417 discloses a polymerization method of one compound selected from the group consisting of methyl methacrylate, alkyl acrylate, and alkyl methacrylate with a copolymerizable vinyl monomer in a three-stage process to improve processibility and foamability. The three-stage polymerization process comprises first stage polymerization of adjusting low glass transition temperature (Tg), second stage polymerization of adjusting the Tg higher than that of the first stage polymerization, and third stage polymerization of adjusting the Tg lower than that of the second stage polymerization.

In addition, U.S. Pat. No. 6,221,966 discloses a two-stage polymerization method to improve processibility, transparency, and foaming properties of the vinyl chloride resin, which decreases the size of the particle diameter, the outer layer of the two-stage has relatively higher glass transition temperature(Tg), and the inner layer has relatively lower glass transition temperature(Tg) of the two-stage by reducing the content of methyl methacrylate. However, this method provides insufficient processibility enhancement and uniformity of foamed cells.

U.S. Pat. No. 6,391,976 also discloses a method of adding a small amount of a processing aid consisting of methyl methacrylate and alkyl methacrylate having 3 to 5 of carbon number, however, the method does not meet processibility and foaming properties.

SUMMARY OF THE INVENTION

To solve the above problems, it is an object of the present invention to provide a crosslinked polymer nanoparticle containing composition capable of providing improved foaming properties of a vinyl chloride resin upon being added to the vinyl chloride resin.

It is another object of the present invention to provide a method for preparing a copolymer from the crosslinked polymer nanoparticle containing composition.

It is a further object of the present invention to provide a foam molded properties reinforced vinyl chloride resin comprising the crosslinked polymer nanoparticle containing copolymer.

In accordance with the present invention, the above and other objects can be accomplished by the provision of a crosslinked polymer nanoparticles—containing composition comprising 2 to 20% by weight of crosslinked polymer nanoparticles having an average particle size of 40 to 100 nm, and 80 to 98% by weight of a vinyl-based copolymer, based on the total weight of the composition.

In accordance with an aspect of the present invention, the above and other objects can be accomplished by the provision of a method for preparing the crosslinked polymer nanoparticle containing copolymer comprising steps of preparing a latex of crosslinked polymer nanoparticles having an average particle size of 40 to 100 nm by polymerizing 95 to 99.8% by weight of a vinyl monomer and 0.2 to 5% by weight of a crosslinking agent, and adding 2 to 20% by weight of the latex of crosslinked polymer nanoparticles to a monomer mixture consisting of 10 to 70% by weight of an alkyl (meth)acrylate monomer, 12 to 72% by weight of an aromatic vinyl monomer, and 6 to 36% by weight of a vinyl cyanide monomer, and then sequentially polymerizing the mixture.

In accordance with another aspect of the present invention, there is provided a method for preparing a crosslinked polymer nanoparticle containing copolymer comprising sequential steps of preparing crosslinked polymer nanoparticles having an average particle size of 40 to 100 nm by polymerizing 95 to 99.8% by weight of a vinyl monomer and 0.2 to 5% by weight of a crosslinking agent, preparing a vinyl-based copolymer by polymerizing 10 to 70% by weight of an alkyl (meth)acrylate monomer, 12 to 72% by weight of an aromatic vinyl monomer, and 6 to 36% by weight of a vinyl cyanide monomer, and mixing 2 to 20% by weight of the crosslinked polymer nanoparticles and 80 to 98% by weight of the vinyl-based copolymer in a latex form.

In accordance with a further aspect of the present invention, there is provided a foam molded properties reinforced vinyl chloride resin obtained by a formulation within the range of 1 to 20 parts by weight of the copolymer prepared by the aforementioned method, based on 100 parts by weight of a vinyl chloride.

DETAILED DESCRIPTION OF THE INVENTION

Hereinafter, the present invention will be described in detail.

Technical features of the present invention are to provide a foam molded properties and processibility reinforced vinyl chloride resin by preparing a crosslinked polymer nanoparticle containing copolymer from a copolymer composition consisting of a linear noncrosslinked vinyl-based copolymer and a nonlinear crosslinked polymer nanoparticles, and then adding the crosslinked polymer nanoparticle containing copolymer to a vinyl chloride resin.

Particularly, the crosslinked polymer nanoparticle containing composition according to the present invention is characterized in that comprises a crosslinked polymer nanoparticle having an average particle size of 40 to 100 nm and a vinyl-based copolymer, based on the total weight of the composition.

Hereinafter, the term "crosslinked polymer nanoparticle" used herein refers to a particulate phase as the crosslinked vinyl monomer-based polymer with the average particle size of the nano-sized particle.

In addition, the crosslinked polymer nanoparticles used herein may have excellent foam molding properties when the average particle size of the nanoparticles is in the range of 40 to 100 nm as identified as identified in examples. The average particle size is not limited to, may be measured values using—a NICOMP 380, a submicron particle sizer manufactured by Particle Sizing Systems (PSS) as described below.

In particular, the copolymer composition is characterized in that the powder obtained from a mixed phase between a latex of crosslinked polymer nanoparticles and a latex of a vinyl-based copolymer, or the powder obtained from a mixed phase between a latex of crosslinked polymer nanoparticles and initial materials for a vinyl-based copolymer.

In this regard, the crosslinked polymer nanoparticles are vinyl monomer-based polymers including a certain amount of a crosslinking agent, the vinyl monomer is not limited to, be at least one compound selected from the group consisting of methyl acrylate, ethyl acrylate, n-butyl acrylate, lauryl acrylate, stearyl acrylate, 2-ethylhexyl acrylate, cyclohexyl acrylate, methyl methacrylate, n-butyl methacrylate, lauryl methacrylate, stearyl methacrylate, tridecyl methacrylate, iso-butyl methacrylate, t-butyl methacrylate, 2-ethylhexyl methacrylate, and cyclohexyl methacrylate.

For an example, the above vinyl monomer may include 4.8 to 25% by weight of at least one alkyl acrylate monomer selected from the group consisting of methyl acrylate, ethyl acrylate, n-butyl acrylate, lauryl acrylate, stearyl acrylate, 2-ethylhexyl acrylate, and cyclohexyl acrylate, and 70 to 95% by weight of at least one alkyl methacrylate monomer selected from the group consisting of methyl methacrylate, n-butyl methacrylate, lauryl methacrylate, stearyl methacrylate, tridecyl methacrylate, iso-butyl methacrylate, t-butyl methacrylate, 2-ethylhexyl methacrylate, and cyclohexyl methacrylate.

In this regard, the vinyl monomer may be contained in an amount of 95 to 99.8% by weight, more preferably, 95 to 98% by weight, based on the total weight of monomers for the crosslinked polymer nanoparticle containing composition. When the content of the vinyl monomer is 95% by weight or less, or 99.8% by weight excess, foaming is not uniform during a foam molding process, and thus cause foam molding degradation such as an increase in cell size, may be caused as shown in Comparative Examples 7 and 8.

In addition, the crosslinking agent may be at least one compound selected from the group consisting of divinyl benzene, 1,3-butanediol diacrylate, 1,3-butanediol dimethacrylate, 1,4-butanediol diacrylate, 1,4-butanediol dimethacrylate, allyl acrylate, allyl methacrylate, trimethylolpropane triacrylate, tetraethylene glycol diacrylate, and tetraethylene glycol dimethacrylate.

In this regard, the crosslinking agent can be used within the range of 0.2 to 5% by weight, more preferably, 2 to 5% by weight, based on the total weight of the monomers for the crosslinked polymer nanoparticle containing composition.

Thus obtained crosslinked polymer nanoparticles having an average particle size of 40 to 100 nm, more preferably, 60 to 80 nm, may be contained in an amount of 2 to 20% by weight, more preferably, 3 to 15% by weight, based on the total weight of the monomers for the crosslinked polymer nanoparticle containing composition.

In addition, the vinyl-based copolymer used herein, is not limited to be a copolymer including 10 to 70% by weight of alkyl (meth)acrylate monomer, 12 to 72% by weight of aromatic vinyl monomer, and 6 to 36% by weight of vinyl cyanide monomer. Initial materials of the vinyl-based copolymer may also be the same.

In this regard, the alkyl (meth)acrylate monomer, is not limited to be at least one compound selected from the group consisting of methyl acrylate, methyl methacrylate, ethyl acrylate, ethyl methacrylate, n-butyl acrylate, n-butyl methacrylate, iso-butyl methacrylate, t-butyl methacrylate, lauryl acrylate, lauryl methacrylate, stearyl acrylate, stearyl methacrylate, tridecyl acrylate, tridecyl methacrylate, 2-ethylhexyl acrylate, 2-ethylhexyl methacrylate, cyclohexyl acrylate, and cyclohexyl methacrylate and is desirable to be used in the range of 10 to 70% by weight, more preferably, 20 to 60% by weight.

In addition, the aromatic vinyl monomer, is not limited to be at least one compound selected from the group consisting of styrene, α-methyl styrene, t-butyl styrene, chlorostyrene, and p-methyl styrene and is desirable to be used in the range of 12 to 72% by weight, more preferably, 28 to 56% by weight.

In addition, the vinyl cyanide monomer, is not limited to be at least one compound selected from the group consisting of acrylonitrile, methacrylonitrile, fumaronitrile, α-chloronitrile, and α-cyano ethyl acrylonitrile and is desirable to be used in the range of 6 to 36% by weight, and more preferably, 12 to 21% by weight.

The above vinyl-based copolymer may be used in the range of 80 to 98% by weight, more preferably, 85 to 97% by weight, based on the total weight of the monomers for the crosslinked polymer nanoparticle containing composition.

Aforementioned crosslinked polymer nanoparticle containing composition may be prepared to be used as a processing aid for foam molding of the vinyl chloride resin. An example of the preparing method is as follows:

step of preparing a latex of crosslinked polymer nanoparticles having an average particle size of 40 to 100 nm by polymerizing 95 to 99.8% by weight of a vinyl monomer and 0.2 to 5% by weight of a crosslinking agent (step 1a), and step of adding 2 to 20% by weight of the latex of crosslinked polymer nanoparticles to 80 to 98% by weight of 100% by weight of the total monomer mixture consisting of 10 to 70% by weight of an alkyl (meth)acrylate monomer, 12 to 72% by weight of an aromatic vinyl monomer, and 6 to 36% by weight of a vinyl cyanide monomer, and then sequentially polymerizing the mixture (step 1b).

Particularly, as a step 1a, polymerization of 95 to 99.8% by weight of the vinyl monomer and 0.2 to 5% by weight of the crosslinking agent is performed by emulsion polymerization, suspension polymerization, or solution polymerization to prepare the latex of crosslinked polymer nanoparticles having an average particle size of 40 to 100 nm.

Subsequently, as a step 1b, 2 to 20% by weight of the latex of crosslinked polymer nanoparticles is added to 80 to 98% by weight of 100% by weight of the total monomer mixture consisting of 10 to 70% by weight of the alkyl (meth)acrylate monomer, 12 to 72% by weight of the aromatic vinyl monomer, and 6 to 36% by weight of the vinyl cyanide monomer, and polymerization is performed by emulsion polymerization, suspension polymerization, or solution polymerization.

As an example, the contents of the ratio of 90 to 95% by weight of total 100% by weight of the monomer mixture and 5 to 10% by weight of the crosslinked polymer nanoparticles may be mixed.

Each polymerization may be used known initiators such as organic peroxides, inorganic peroxides, and nitrogen oxides as the initiators. Examples of the initiator may include organic peroxides such as t-butyl hydroperoxide, 1,1,3,3-tetramethylbutyl hydroperoxide, succinic acid peroxide, peroxy maleic acid t-butyl ester, cumene hydroperoxide, and benzoyl peroxide, inorganic peroxides such as potassium persulfate and sodium persulfate, or oil-soluble initiators such as azobisisobutyronitrile. Such initiators may be used as common redox initiators combined a reducing agent of sodium sulfite, sodium thiosulfate, sodium metabisulfite, sodium bisulfite, sodium dithionite, sodium 2-hydroxy-2-sulfinato acetic acid, ascorbic acid, hydroxyl acetone, ferrous sulfate with EDTA complex.

In addition, surfactants used in the emulsion polymerization may be used also known surfactants. Particularly, examples of the surfactants may be used anionic surfactants such as sodium alkyl sulfonate, sodium alkylbenzene sulfonate, sodium dioctyl sulfonate, sodium lauryl sulfate, and sodium fatty acid, or non-ionic surfactants such as alkyl phenols, aliphatic alcohols, and a reaction product of propylene oxide and ethylene oxide.

The composition of the present invention may be combine one or more of an antioxidant, a heat stabilizer, a UV absorber, a UV stabilizer, and a lubricant to improve stability for heat and light.

Then, the resultant is agglomerated dried or spray dried to obtain a powder of the crosslinked polymer nanoparticle containing copolymer.

For the other example for the preparation method is as follows:

step of preparing crosslinked polymer nanoparticles in the same manner mentioned as in the above step 1a, but simultaneously or sequentially, preparing a vinyl-based copolymer by polymerizing a monomer mixture consisting of 10 to 70% by weight of an alkyl (meth)acrylate monomer, 12 to 72% by weight of an aromatic vinyl monomer, and 6 to 36% by weight of a vinyl cyanide monomer by emulsion polymerization, suspension polymerization, or solution polymerization (step 2a).

Then, as step 2b, the crosslinked polymer nanoparticles and the vinyl-based copolymer are mixed as latex form. The mixture is agglomerated dried or spray dried to obtain a powder of the crosslinked polymer nanoparticle containing copolymer.

As a result of preparing each powder type from each latex type for the crosslinked polymer nanoparticles and the vinyl-based copolymer powder and then mixing together as shown in Comparative Example 4, foaming properties are deteriorated, thereby degrading the foam specific gravity.

Thus obtained powder type crosslinked polymeric nanoparticle containing copolymer is added within the range of 1 to 20 parts by weight, for example 2 to 10 parts by weight to 100 parts by weight of the vinyl chloride monomer, and the mixture knead and extrude to provide a foam molded properties reinforced vinyl chloride resin.

Hereinafter, the present invention will be described in more detailed with reference to the following examples, but the scope of the present invention is not limited to the below embodiments.

EXAMPLES 1 TO 9 AND COMPARATIVE EXAMPLES 1 TO 8

Example 1

Step 1a: Preparation of Crosslinked Polymer Nanoparticles(a)

200 parts by weight of deionized water, 1.5 parts by weight of sodium lauryl sulfate, 0.03 parts by weight of ethylenediamine tetrasodium acetate, and 0.002 parts by weight of ferrous sulfate were added to an 8 L polymerization reactor equipped with a stirrer. A nitrogen gas was sufficiently supplied into the reactor and the reactor was heated to 60□. Then, 78% by weight of methyl methacrylate (MMA) and 20% by weight of butyl acrylate (BA), as vinyl monomers, and 2% by weight of allyl methacrylate (AMA), as a crosslinking agent were added thereto.

0.2 parts by weight of sodium formaldehyde sulfoxylate and 0.2 parts by weight of tertiary butyl hydroperoxide were added to the reactor, and polymerization was continued for 6 hours to obtain a latex of crosslinked polymer nanoparticles having an average particle size of 60 nm (polymerization conversion rate: 99.5%).

The average particle size was measured value using a NICOMP 380, as a submicron particle sizer manufactured by Particle Sizing Systems (PSS).

Step 1b: Preparation of Composition for Copolymer of Crosslinked Polymer Nanoparticles(a) and Vinyl-Based Copolymer(b)

0.2 parts by weight of an emulsifier (Latemul ASK, KAO), 0.02 parts by weight of sodium ethylenediamine tetra acetate, 0.001 parts by weight of ferrous sulfate, and 10% by weight (solid content) of the latex of crosslinked nanoparticles(a) were added to the reactor, and the reactor was heated to 60° C.

Then, 27% by weight of methyl methacrylate, 44.1% by weight of styrene, and 18.9% by weight of acrylonitrile were added thereto as monomers for the vinyl-based copolymer(b). 0.04 parts by weight of sodium formaldehyde sulfoxylate and 0.004 parts by weight of tertiary butyl hydroperoxide were added to the reactor, and polymerization was continued for 6 hours to obtain a crosslinked nanoparticle containing copolymer composition (polymerization conversion rate: 98.5%).

The obtained latex was agglutinated using calcium chloride, and washed and dried to prepare a powder of the copolymer.

Example 2

Step 2a: Preparation of Crosslinked Polymer Nanoparticles(a) and Vinyl-Based Copolymer(b)

Crosslinked polymer nanoparticles having an average particle size of 60 nm were prepared in the same manner as in the above Example 1 (step 1a).

In addition, a vinyl-based copolymer was prepared in the same manner as in the above Example 1 (step 1b), except that 10% by weight of the latex of crosslinked nanoparticles was added.

Step 2b: Preparation of Copolymer Composition of Crosslinked Polymer Nanoparticles(a) and Vinyl-Based Copolymer(b)

90% by weight of the vinyl-based copolymer(b) was added in the presence of 10% by weight of crosslinked nanoparticles (a) to the reactor and mixed in latex form. The obtained composition was agglomerated and dried to obtain a powder of a copolymer.

Example 3

A composition for forming a crosslinked polymer nanoparticle containing copolymer(a) was prepared in the same manner as in the above Example 1, except that 28.5% by weight of methyl methacrylate, 46.5% by weight of styrene, and 20% by weight of acrylonitrile were added, as initial monomers for the vinyl-based copolymer(b), in the presence of 5% by weight of the crosslinked polymer nanoparticles to the reactor containing in step 1b. The obtained composition was spray-dried to obtain a powder of a copolymer.

Example 4

A vinyl-based copolymer(b) was prepared in the same manner as in the above Example 1 (step 1b), except that 3% by weight of the latex of crosslinked polymer nanoparticles(a) was added thereto. The obtained latex was agglutinated and dried in the same manner as in the above Example 1 to prepare a powder of a copolymer.

Example 5

A vinyl-based copolymer(b) was prepared in the same manner as in the above Example 1 (step 1b), except that 15% by weight of the latex of crosslinked nanoparticles(a) was added. The obtained latex was agglomerated and dried in the same manner as in the above Example 1 to prepare a powder of a copolymer.

Example 6

The process was performed in the same manner as in the above Example 1, except that 20% by weight of methyl methacrylate, 56% by weight of styrene, and 24% by weight of acrylonitrile were added, as initial monomers for the vinyl-based copolymer(b), in the presence of 10% by weight of the latex of crosslinked polymer nanoparticles(a) by step 1a to the reactor.

Example 7

The process was performed in the same manner as in the above Example 1, except that 60% by weight of methyl methacrylate, 28% by weight of styrene, and 12% by weight of acrylonitrile were added, as initial monomers for the vinyl-based copolymer(b), in the presence of 10% by weight of the latex of crosslinked polymer nanoparticles(a) by step 1a to the reactor containing.

Example 8

The process was performed in the same manner as in the above Example 1, except that 75% by weight of methyl methacrylate (MMA) and 20% by weight of butyl acrylate (BA) as vinyl monomers and 5% by weight of allyl methacrylate (AMA) as a crosslinking agent were added to the reactor in the preparation of the crosslinked polymer nanoparticles(a) in step 1a.

Example 9

The process was performed in the same manner as in the above Example 1, except that 150 parts by weight of deionized water and 1.2 parts by weight of sodium lauryl sulfate were used to prepare particulate foam having an average particle size of 80 nm in step 1a.

Comparative Example 1

A vinyl-based copolymer(b) alone was prepared in the same manner as in the above Example 1, except that the latex of crosslinked polymer nanoparticles(a) was not added thereto, and the obtained latex was agglomerated and dried in the same manner as in the above Example 1 to obtain a powder of a copolymer.

Comparative Example 2

The process was performed in the same manner as in the above Example 1, except that 29.7% by weight of methyl methacrylate, 48.5% by weight of styrene, and 20.8% by weight of acrylonitrile(a) were added, an initial monomers for the vinyl-based copolymer(b), in the presence of 1% by weight of the latex of crosslinked polymer nanoparticles by step 1a to the reactor.

Comparative Example 3

The process was performed in the same manner as in the above Example 1, except that 22.5% by weight of methyl methacrylate, 36.75% by weight of styrene, and 15.75% by weight of acrylonitrile(a) were added, as initial monomers for the vinyl-based copolymer(b), in the presence of 25% by weight of the latex of crosslinked polymer nanoparticles by step 1a to the reactor.

Comparative Example 4

The process was performed in the same manner as in the above Example 1, except that crosslinked polymer nanoparticles(a) having an average particle size of 60 nm prepared by step 2a of Example 1 were agglomerated alone to a powder form, and a vinyl-based copolymer(b) alone by step 2b was agglomerated to a powder form, and then the powders were mixed.

Comparative Example 5

The process was performed in the same manner as in the above Example 1, except that 175 parts by weight of deionized water and 1.0 part by weight of sodium lauryl sulfate were replaced to prepare crosslinked polymer nanoparticles having an average particle size of 110 nm in step 1a.

Comparative Example 6

The process was performed in the same manner as in the above Example 1, except that 300 parts by weight of deionized water and 2 parts by weight of sodium lauryl sulfate were replaced to prepare crosslinked polymer nanoparticles having an average particle size of 35 nm in step 1a.

Comparative Example 7

The process was performed in the same manner as in the above Example 1, except that 79.9% by weight of methyl methacrylate and 0.1% by weight of allyl methacrylate were used in step 1a to prepare crosslinked polymer nanoparticles (a) having an average particle size of 60 nm.

Comparative Example 8

The process was performed in the same manner as in the above Example 1, except that 68% by weight of methyl methacrylate and 12% by weight of allyl methacrylate were replaced in step 1a to prepare crosslinked polymer nanoparticles(a) having an average particle size of 60 nm.

5 parts by weight of each of the powders of the copolymers obtained in the above Examples 1 to 9 and Comparative Examples 1 to 8 was mixed with 100 parts by weight of a vinyl chloride resin (LG080, LG Chem Ltd.), 4 parts by weight of a heat stabilizer (OTL-9, Sun Kyoung Chemical Co., Ltd.), 7 parts by weight of calcium carbonate, 2 parts by weight of a lubricant, 2 parts by weight of $TiO_2$, and 0.7 parts by weight of a foaming agent (azodicarbonamide) using a Hensel mixer while heating to 115° C. Foam molding of the mixture was performed using a 30 mm single spindle extruder equipped with a rectangular slit die at a cylinder temperature of 180° C. and a screw speed of 30 rpm to fabricate a test sample having thickness of 5 mm and width of 30 mm.

Then, physical properties were measured according to the below test items and the results are shown in Tables 1 and 2 below.

Test Items

Foam extrusion torque (%), melting pressure (bar), and melting temperature (□): measured using a Klauss Maffei foam extruder (C1/C2/A/D=170/178/180/178□, processing aids: 4 phr).

Foam extrusion extruded output (g/min): mass of a product processing in the extruder per 1 min during foam extrusion.

Foam extrusion foaming specific gravity ($g/cm^3$): measured using a specific gravity meter.

Foam extrusion foam cell size (mm): averaged 50 as cell size measured via optical microscope.

TABLE 1

| Example | (a) Cross-linked polymer nano-particles | (b) Vinyl-based co-polymer | Content ratio of a/a + b | Remark | Torque | Melting pressure | Melting temperature | Extrusion output | Foam specific gravity | Foam cell size |
|---|---|---|---|---|---|---|---|---|---|---|
| 1 | MMA78, BA20, AMA2 | MMA30, SM49, AN21 | 10% | polymerizing(a) -> polymerizing(b) -> agglomerating | 74 | 187 | 182 | 142 | 0.72 | 0.14 |
| 2 | MMA78, BA20, AMA2 | MMA30, SM49, AN21 | 10% | Polymerizing each (a) and (b) -> latex mixing -> agglomerating | 71 | 178 | 182 | 136 | 0.75 | 0.11 |
| 3 | MMA78, BA20, AMA2 | MMA30, SM49, AN21 | 5% | Polymerizing (a) -> polymerizing(b) -> agglomerating | 76 | 173 | 183 | 150 | 0.77 | 0.11 |
| 4 | MMA78, BA20, AMA2 | MMA30, SM49, AN21 | 3% | Polymerizing (a) -> polymerizing(b) -> agglomerating | 76 | 174 | 183 | 152 | 0.75 | 0.12 |
| 5 | MMA78, BA20, AMA2 | MMA30, SM49, AN21 | 15% | Polymerizing (a) -> polymerizing(b) -> agglomerating | 79 | 187 | 182 | 140 | 0.74 | 0.13 |
| 6 | MMA78, BA20, AMA2 | MMA20, SM56, AN24 | 10% | Polymerizing (a) -> polymerizing(b) -> agglomerating | 74 | 183 | 182 | 150 | 0.76 | 0.11 |
| 7 | MMA78, BA20, AMA2 | MMA60, SM28, AN12 | 10% | Polymerizing (a) -> polymerizing(b) -> agglomerating | 76 | 189 | 183 | 152 | 0.70 | 0.14 |
| 8 | MMA75, BA20, AMA5 | MMA30, SM49, AN21 | 10% | Polymerizing (a) -> polymerizing(b) -> agglomerating | 75 | 183 | 182 | 142 | 0.73 | 0.10 |
| 9 | MMA78, BA20, AMA2 | MMA30, SM49, AN21 | 10% | Average particle size of (a): 80 nm. | 72 | 187 | 183 | 139 | 0.77 | 0.11 |

MMA: methyl methacrylate
BA: butyl acrylate
AMA: allyl methacrylate
SM: styrene
AN: acrylonitrile

TABLE 2

| Comparative Example | (a) Crosslinked polymer nanoparticles | (b) Vinyl-based copolymer | Content ratio of a/a + b | Remark | Foaming properties (5 parts by weight of copolymer) | | | | | |
|---|---|---|---|---|---|---|---|---|---|---|
| | | | | | Torque | Melting pressure | Melting temperature | Extrusion output | Foam specific gravity | Foam cell size |
| 1 | NA | MMA 30, SM 49, AN 21 | 0% | Polymerizing only (b) -> agglomerating | 68 | 180 | 183 | 127 | 0.86 | 0.15 |
| 2 | MMA 78, BA 20, AMA 2 | MMA 30, SM 49, AN 21 | 1% | Using 1% of (a) in Example 1 | 67 | 178 | 183 | 127 | 0.85 | 0.13 |
| 3 | MMA 78, BA 20, AMA 2 | MMA 30, SM 49, AN 21 | 25% | Using 25% of (a) in Example 1 | 70 | 181 | 183 | 131 | 0.78 | 0.20 |
| 4 | MMA 78, BA 20, AMA 2 | MMA 30, SM 49, AN 21 | 10% | Polymerizing and agglomerating (a) + polymerizing and agglomerating (b) -> mixing powders | 74 | 184 | 183 | 135 | 0.83 | 0.13 |
| 5 | MMA 78, BA 20, AMA 2 | MMA 30, SM 49, AN 21 | 10% | Average particle size of (a): 110 nm | 71 | 188 | 183 | 129 | 0.83 | 0.17 |
| 6 | MMA 78, BA 20, AMA 2 | MMA 30, SM 49, AN 21 | 10% | Average particle size of (a): 35 nm | 72 | 184 | 183 | 131 | 0.82 | 0.16 |
| 7 | MMA 79.9, BA 20, AMA 0.1 | MMA 30, SM 49, AN 21 | 10% | AMA included in (a): 0.1% | 70 | 181 | 183 | 131 | 0.78 | 0.20 |
| 8 | MMA 68, BA 20, AMA 12 | MMA 30, SM 49, AN 21 | 10% | AMA included in (a): 12% | 76 | 188 | 183 | 138 | 0.78 | 0.17 |

MMA: methyl methacrylate
BA: butyl acrylate
AMA: allyl methacrylate
SM: styrene
AN: acrylonitrile As shown in Tables 1 and 2, compared to Examples 1 to 9, when the crosslinked polymer nanoparticles(a) were not used as in Comparative Example 1, or when a trace amount of the crosslinked polymer nanoparticles(a) was used as in Comparative Example 2, foaming was not appropriately performed upon foam molding, so that the foam specific gravity was increased. When excessive amount of the crosslinked polymer nanoparticles(a) was used as in Comparative Example 3, foaming was not uniformly performed, so that cell size was increased.

Furthermore, when the crosslinked polymer nano Particles (a) and the vinyl-based copolymer(b) were mixed as not each latex type but each powder type, as in Comparative Example 4, the crosslinked polymer nanoparticles were not uniformly distributed therein, such that foaming was not properly performed, thereby showing increased form specific gravity. When the particle size of the crosslinked polymer nanoparticles(a) was inappropriate as in Comparative Examples 5 and 6, the form specific gravity was lowered. When the crosslinking agent was underused or overused as in Comparative Examples 7 and 8, the form specific gravity was relatively reduced, but foam molding properties were deteriorated such as the foamed cell size increased due to non-uniform foaming.

Processing aid in according with the present invention, as described above, provides the effects of improved foam molding properties and processibility of a vinyl chloride resin during a foam molding process upon being added to the vinyl chloride resin.

What is claimed is:

1. A crosslinked polymer nanoparticle containing composition comprising:
    2 to 20% by weight of crosslinked polymer nanoparticles having an average particle size of 40 to 100 nm; and
    80 to 98% by weight of a vinyl-based copolymer, based on the total weight of the composition,
    wherein the crosslinked polymer nanoparticles are polymers consisting of 95 to 99.8% by weight of a vinyl monomer and 0.2 to 5% by weight of a crosslinking agent,
    wherein the crosslinking agent is at least one compound selected from the group consisting of 3-butanediol diacrylate, 1,4-butanediol dimethacrylate, allyl acrylate, allyl methacrylate, trimethylolpropane triacrylate, tetraethylene glycol diacrylate, and tetraethylene glycol dimethacrylate, and
    wherein the vinyl-based copolymer is a copolymer of an alkyl (meth)acrylate monomer, an aromatic vinyl monomer, and a vinyl cyanide monomer.

2. The crosslinked polymer nanoparticle containing composition according to claim 1, wherein the composition is a mixed phase between a latex of the crosslinked polymer nanoparticles and a latex of the vinyl-based copolymer.

3. The crosslinked polymer nanoparticle containing composition according to claim 1, wherein the composition is a mixed phase between a latex of the crosslinked polymer nanoparticles and initial materials for the vinyl-based copolymer comprising an alkyl (meth)acrylate monomer, an aromatic vinyl monomer, and a vinyl cyanide monomer.

4. The crosslinked polymer nanoparticle containing composition according to claim 1, wherein the vinyl monomer comprises at least one compound selected from the group consisting of methyl acrylate, ethyl acrylate, n-butyl acrylate, lauryl acrylate, stearyl acrylate, 2-ethylhexyl acrylate, cyclohexyl acrylate, methyl methacrylate, n-butyl methacrylate, lauryl methacrylate, stearyl methacrylate, tridecyl methacrylate, iso-butyl methacrylate, t-butyl methacrylate, 2-ethylhexyl methacrylate, and cyclohexyl methacrylate.

5. The crosslinked polymer nanoparticle containing composition according to claim 1, wherein the vinyl monomer comprises 4.8 to 25% by weight of at least one alkyl acrylate monomer selected from the group consisting of methyl acrylate, ethyl acrylate, n-butyl acrylate, lauryl acrylate, stearyl acrylate,2-ethylhexyl acrylate, and cyclohexyl acrylate; and 70 to 95% by weight of at least one alkyl methacrylate monomer selected from the group consisting of methyl methacrylate, n-butyl methacrylate, lauryl methacrylate, stearyl methacrylate, tridecyl methacrylate, iso-butyl methacrylate, t-butyl methacrylate, 2-ethylhexyl methacrylate, and cyclohexyl methacrylate.

6. The crosslinked polymer nanoparticle containing composition according to claim 1, wherein the vinyl-based copolymer is a copolymer of 10 to 70% by weight of the alkyl (meth)acrylate monomer; 12 to 72% by weight of the aromatic vinyl monomer; and 6 to 36% by weight of the vinyl cyanide monomer.

7. The crosslinked polymer nanoparticle containing composition according to claim 6, wherein the alkyl (meth)acrylate monomer is at least one compound selected from the group consisting of methyl acrylate, methyl methacrylate, ethyl acrylate, ethyl methacrylate, n-butyl acrylate, n-butyl methacrylate, iso-butyl methacrylate, t-butyl methacrylate, lauryl acrylate, lauryl methacrylate, stearyl acrylate, stearyl methacrylate, tridecyl acrylate, tridecyl methacrylate, 2-ethylhexyl acrylate, 2-ethylhexyl methacrylate. cyclohexyl acrylate. and cyclohexyl methacrylate.

8. The crosslinked polymer nanoparticle containing composition according to claim 6, wherein the aromatic vinyl monomer is at least one compound selected from the group consisting of styrene, α-methyl styrene, t-butyl styrene, chlorostyrene, and p-methyl styrene.

9. The crosslinked polymer nanoparticle containing composition according to claim 6, wherein the vinyl cyanide monomer is at least one compound selected from the group consisting of acrylonitrile, methacrylonitrile, fumaronitrile, α-chloronitrile, and α-cyano ethyl acrylonitrile.

10. A method for preparing a crosslinked polymer nanoparticle containing copolymer, the method comprising steps of:

preparing a latex of crosslinked polymer nanoparticles having an average particle size of 40 to 100 nm by polymerizing 95 to 99.8% by weight of a vinyl monomer and 0.2 to 5% by weight of a crosslinking agent which is at least one compound selected from the group consisting of 3-butanediol diacrylate, 1,4-butanediol dimethacrylate, allyl acrylate, allyl methacrylate, trimethylolpropane triacrylate, tetraethylene glycol diacrylate, and tetraethylene glycol dimethacrylate; and adding 2 to 20% by weight of the latex of crosslinked polymer nanoparticles to a monomer mixture consisting of 10 to 70% by weight of an alkyl (meth)acrylate monomer, 12 to 72% by weight of an aromatic vinyl monomer, and 6 to 36% by weight of a vinyl cyanide monomer, and then sequentially polymerizing the mixture.

11. The method according to claim 10, further comprising the step of obtaining a powder of the crosslinked polymer nanoparticle containing copolymer by spray drying or agglomerate drying the resultant obtained by the polymerization.

12. A method for preparing a crosslinked polymer nanoparticle containing copolymer, the method comprising sequential steps of:

preparing crosslinked polymer nanoparticles having an average particle size of 40 to 100 nm by polymerizing 95 to 99.8% by weight of a vinyl monomer and 0.2 to 5% by weight of a crosslinking agent which is at least one compound selected from the group consisting of 3-butanediol diacrylate, 1,4-butanediol dimethacrylate, allyl acrylate, allyl methacrylate, trimethylolpropane triacrylate, tetraethylene glycol diacrylate, and tetraethylene glycol dimethacrylate;

preparing a vinyl-based copolymer by polymerizing 10 to 70% by weight of an alkyl (meth)acrylate monomer, 12 to 72% by weight of an aromatic vinyl monomer, and 6 to 36% by weight of a vinyl cyanide monomer; and mixing 2 to 20% by weight of the crosslinked polymer nanoparticles and 80 to 98% by weight of the vinyl-based copolymer in a latex form.

13. The method according to claim 12, further comprising the step of obtaining a powder of the crosslinked polymer nanoparticle containing copolymer by spray drying or agglomerate drying the resultant obtained by the polymerization.

14. A foam molded properties reinforced vinyl chloride resin obtained by a formulation of a vinyl chloride with the powder of claim 11, wherein the powder is included in an amount of 1 to 20 parts by weight based on 100 parts by weight of the vinyl chloride.

* * * * *